United States Patent [19]

Takahashi

[11] Patent Number: 5,464,959

[45] Date of Patent: Nov. 7, 1995

[54] ION EXCHANGE TREATMENT METHOD IN PRODUCING AND RECYCLING AQUEOUS EDM FLUID

[75] Inventor: Nobuyuki Takahashi, Yokohama, Japan

[73] Assignee: Sodick Co., Ltd., Yokohama, Japan

[21] Appl. No.: 167,971

[22] PCT Filed: Apr. 28, 1993

[86] PCT No.: PCT/JP93/00572

§ 371 Date: Feb. 1, 1994

§ 102(e) Date: Feb. 1, 1994

[87] PCT Pub. No.: WO93/22094

PCT Pub. Date: Nov. 11, 1993

[30] Foreign Application Priority Data

Apr. 28, 1992 [JP] Japan .................................. 4-110306
Dec. 18, 1992 [JP] Japan .................................. 4-354903

[51] Int. Cl.[6] .................................................. B23H 1/10
[52] U.S. Cl. ................................ 219/69.14; 204/129.75; 210/662
[58] Field of Search ........................... 219/69.14, 69.17; 210/96.1, 97, 662; 204/129.75, 129.95

[56] References Cited

U.S. PATENT DOCUMENTS

| 4,551,602 | 11/1985 | Inoue et al. | 219/69.14 |
|---|---|---|---|
| 4,584,450 | 4/1986 | Inoue | 219/69.17 |
| 4,626,332 | 12/1986 | Inoue | 219/69.14 |
| 4,917,806 | 4/1990 | Matsunaga et al. | 210/662 |

FOREIGN PATENT DOCUMENTS

| 53-125439 | 11/1978 | Japan . | |
|---|---|---|---|
| 56-15310 | 4/1981 | Japan . | |
| 60135128 | 7/1985 | Japan . | |
| 62-74528 | 4/1987 | Japan | 219/69.14 |
| 62-193652 | 8/1987 | Japan | 210/662 |
| 62-193651 | 8/1987 | Japan | 210/662 |
| 62-297020 | 12/1987 | Japan . | |
| 63-185526 | 8/1988 | Japan . | |
| 134732 | 7/1989 | Japan . | |
| 2-48112 | 2/1990 | Japan | 219/69.14 |
| 2-41820 | 2/1990 | Japan | 219/69.14 |
| 2-41817 | 2/1990 | Japan | 219/69.14 |
| 3-239414 | 10/1991 | Japan | 219/69.17 |

*Primary Examiner*—Geoffrey S. Evans
*Attorney, Agent, or Firm*—Marks & Murase

[57] ABSTRACT

In an ion exchange treatment method for producing or regenerating an aqueous EDM fluid to be used for electric discharge machining, raw water is supplied under pressure to a column (4) charged with ion-exchange resins, and passed through a resin phase in the column (4), at a conspicuously large space velocity, for example, at least 20 $h^{-1}$. Thereby, "harmful ions" to electric discharge machining are preferentially and selectively removed without excessively reducing electric conductivity of treated water at the outlet of the resin phase. The raw water is circulated through the resin phase, with the ion exchange treatment including such a large space velocity, until overall electric conductivity of treated water in a storage tank (17) is reduced to a desire value. The raw water is prevented from excessive ion exchange treatment to increase the volume of treated water per unit volume of resins, resulting in the longer useful life of resins.

4 Claims, 3 Drawing Sheets

ION EXCHANGE TREATMENT METHOD IN PRODUCING AND RECYCLING AQUEOUS EDM FLUID

BACKGROUND OF THE INVENTION

1. Field of the Invention

The present invention relates to an ion exchange treatment for producing and regenerating an aqueous electric discharge machining fluid. More specifically, the present invention relates to a machining fluid generating method for die-sinking EDM or wire-cut EDM having a desired electrical conductivity upon ion exchange treatment.

2. Description of Related Art

In electric discharge machining for machining a metal workpiece by means of electric discharges, the electric discharge machining is performed in a dielectric medium. An aqueous EDM fluid, which is free from the danger of a fire, is increasingly used as the dielectric medium.

In die-sinking EDM, an aqueous solution, in which are dissolved water-soluble high molecular compounds for enhancing the electric discharge machining efficiency, may be used as an aqueous EDM fluid in place of an oil-based EDM fluid.

On the other hand, in wire-cut EDM for machining a workpiece into a desired configuration using a traveling wire electrode, which wire has been threaded into a start hole of the workpiece, in which electric discharges are induced between the wire and the workpiece while flushing the vicinity of the electric discharging point with a machining fluid, water is generally used as an aqueous EDM fluid because the workpiece may be placed in the atmosphere. Hereinafter, aqueous EDM fluid is referred to as "Machining Fluid" and aqueous EDM fluid is referred to as "Water Machining Fluid" when the aqueous EDM fluid is limited to wire-cut EDM.

Pure water (i.e., water in which almost all ions have been completely removed by ion exchange treatment) is ideal for a water machining fluid. In fact, water, whose electrical conductivity has been regulated to the range of from several $\mu S/cm$ to several tens of $\mu S/cm$ by admixing pure water with tap water, is generally used since it has several advantages, such as increased machining efficiency, low cost, and easy handling. The term "S" designates a siemens, a unit of conductance equal to 1 ampere per volt.

If the wire-cut EDM apparatus and the workpiece are constantly exposed to water containing chlorine ions, they tend to suffer from pitting corrosion (needle-like electrolytic corrosion) and rusting due to electrolytic activity. The pitting corrosion of the workpiece adversely affects the quality of the article being produced.

Consequently, it has been assumed that, in the case of admixing pure water with tap water to regulate electrical conductivity, only slight traces of chlorine ions in the mixed water would be acceptable. In general, when producing the water machining fluid, chlorine ions have been initially removed from the tap water before regulating electrical conductivity to a desired value.

The mixture of tap water and pure water, after used once in wire-cut EDM, may be discarded without regenerating it, but this is unprofitable in industrial practice because of increased running costs.

Therefore, generally, the water machining fluid used once in wire-cut EDM is regenerated. In this regenerating process, the once used water machining fluid is delivered to a storage tank and circulated through filtration equipment by a pump. Then, a portion of the filtered water machining fluid in the storage tank is further treated by ion exchange and returned to the storage tank. Additionally, when the volume of the machining fluid is low, because, for example, of evaporation thereof, supplementary tap water is replenished into the storage tank, and then ion exchange treatment is carried out until the overall electrical conductivity of the machining fluid in the storage tank reaches a value between several $\mu S/cm$ and several tens of $\mu S/cm$, thus allowing reuse of the treated water as an electric discharge machining fluid.

The electrical conductivity of the water machining fluid is regulated to a range of from several $\mu S/cm$ to several tens of $\mu S/cm$, because it has been assumed that there will be an increased risk of problems, such as an adherence of the Bs (brass) to the workpiece, if the conductivity is not maintained in this range, and because electrolytic corrosion is relatively less significant under such conditions, while maintaining high machining efficiency. In most cases, in treating tap water or used water machining fluid by ion exchange, raw water which has collected in the upper portion of a resin phase inside a resin column is allowed to flow down by the potential head. The resin phase in the resin column is formed such that the ratio of the height to the sectional area is large, in other words, it is taller than is wide.

Moreover, as the flow-down speed, a space velocity (referred to as "SV" herein) of about several $h^{-1}$ is generally employed, because it has been assumed that in the conventional ion exchange treatment method, a large flow-down speed of raw water flowing down the resin phase would result in channeling, whereby ions in the raw water could leak into the treated water without being exchanged. The term "$h^{-1}$" designates the reciprocal of an hour, or "per hour".

The term "channeling" as used in the specification, means the phenomenon where raw water, by means of a short cut, passes through the resin phase.

Ion-exchange resins of high quality grade are used in producing pure water or a high-purity water used for semiconductor washing or in a nuclear power generation boiler. Similar resins are generally used also in the field of the electric discharge machining. Though such resins are suitable for adsorbing ionic substances mixed in the machining fluid as a result of electric discharge machining, which substances derive from elements which form a tool electrode and a workpiece, such resins are extremely expensive.

Used ion-exchange resins have been discarded without being regenerated by an acid or an alkali, since the metal particles produced during electric discharge machining are mingled in the used ion-exchange resins.

In conventional ion exchange treatment of used water machining fluid, almost all kinds of ions in raw water have been removed. Accordingly, there was a disadvantage that the treated water volume per unit volume of resins was decreased, namely, that the useful life of resins was shortened. In addition, since resins of high quality grade have only a small working capacity, there were disadvantages of increased running costs required for electric discharge machining and of frequent replacement of resins. Further, there was a disadvantage that, when continuously running an electric discharge machine in an unmanned factory over a long period of time, the ion-exchange resins could reach their working capacity limit during machining, thus degrading the article being produced. Thus, electric discharge machining has been commercially limited.

SUMMARY OF THE INVENTION

An object of the invention is to solve the disadvantages of the conventional approaches and to provide a new ion exchange treatment method for tap water or for aqueous EDM fluid, which method can increase the volume of treated water per unit volume of resins and lengthen the useful life of the resins.

A further object of the invention is to provide an ion exchange treatment method which permits continuous running of an electric discharge machine in an unmanned factory over a long period of time without the need for frequent replacement of the resins and which reduces running costs.

The present invention for producing an aqueous EDM fluid used in electric discharge machining, in which a workpiece is machined by inducing electric discharges in a machining gap formed between an electrode and a workpiece while disposing the aqueous EDM fluid in the machining gap, comprises the steps of supplying raw water under pressure into a container charged with ion-exchange resins; detecting the electrical conductivity of the treated water obtained from the container charged with the ion-exchange resins; and adjusting the supply flow rate of raw water at a space velocity greater than 20 $h^{-1}$, whereby the detected electrical conductivity of the treated water decreases below 50 µS/cm.

Further, an aqueous EDM fluid regenerating method according to the present invention comprises the steps of collecting used machining fluid that has been supplied to a machining gap for use in an electric discharge machining; filtering the collected machining fluid and storing it in a storage tank; supplying the stored machining fluid under pressure to a container charged with ion-exchange resins for ion exchange treatment inside the container; detecting the electrical conductivity of the treated water obtained from the container; adjusting the supply flow rate of the stored machining fluid to a space velocity of greater than 20 $h^{-1}$, whereby the detected electrical conductivity of the treated water decreases below a desired value; returning to the storage tank the treated water obtained after the adjustment of supply flow rate; and circulating the treated water through the container until the overall electrical conductivity of machining fluid in the storage tank attains a desired value.

According to the above-mentioned method of the invention, the "harmful ions" to electric discharge machining are selectively and preferentially removed by ion exchange. Further, the raw water is circulated through a resin container where ion exchange treatment is carried out at an extremely large space velocity until the electrical conductivity of the treated water returned to the storage tank is decreased to a desired value for electric discharge machining. Thus, the treated water volume per unit volume of resin increases without excessive ion exchange treatment, thereby lengthening the useful life of the ion-exchange resins.

DESCRIPTION OF THE PREFERRED EMBODIMENTS

Figure 1:
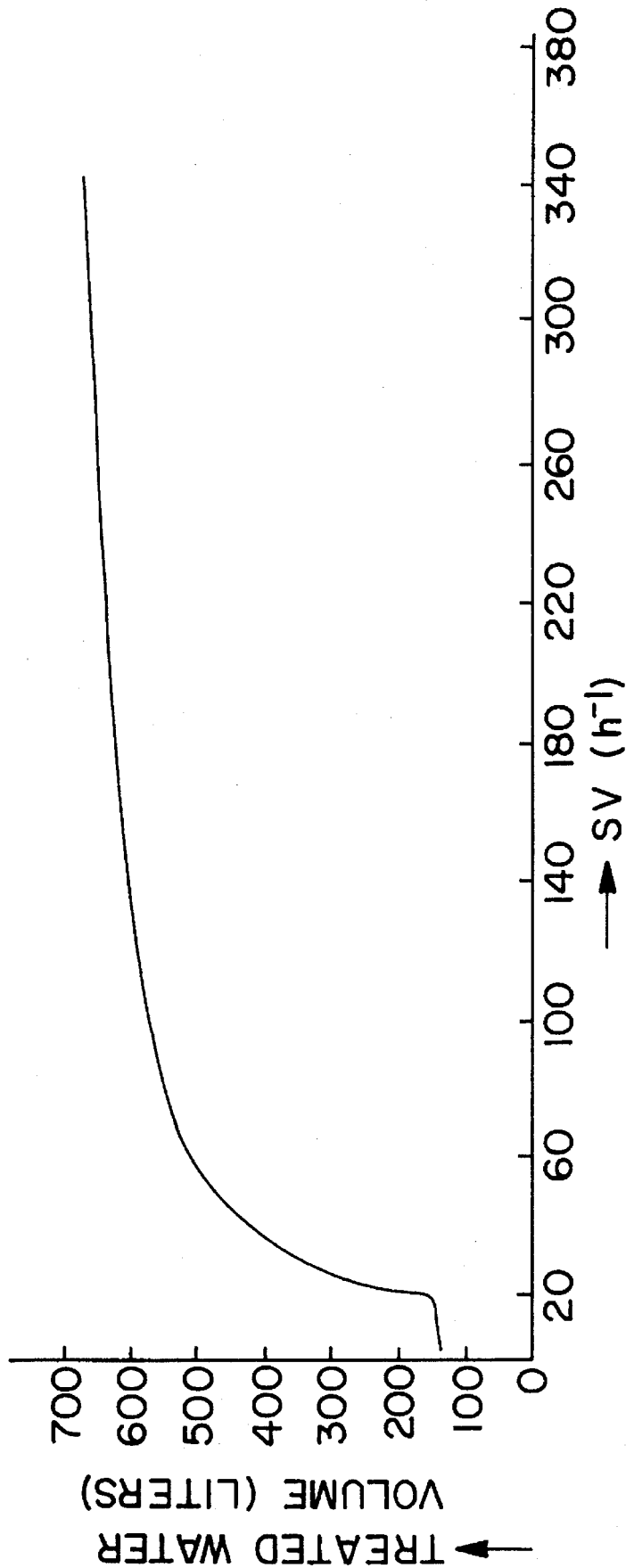
FIG. 1 is a graph illustrating the relationship between the volume of treated water having an electrical conductivity of about 10 µS/cm and the SV used when the treated water is obtained by circulating tap water through a resin column for ion exchange treatment until the ion-exchange resins reach their working capacity limit.

As described above, in the conventional ion exchange treatment of tap water for producing water machining fluid, raw water, stored in the column in which the resins have been charged, is allowed to flow down by the potential of gravity, and an extremely small SV is employed as the flow-down speed. In such a case, the SV is less than 20 $h^{-1}$ at its greatest; in other words, ion exchange has not been carried out at an SV in excess of 20 $h^{-1}$.

This practice has been followed, because it is generally assumed that when the SV is greater than 20 $h^{-1}$, the ion exchange band (the length of the area in the ion-exchange resin phase where the ion exchange reaction is actively occurring) may expand and channeling may result, such that chlorine ions will immediately start leaking into the treated water. In other words, the ion exchange will reach a breakthrough point with respect to chlorine ions, even if only a small amount of tap water is treated.

In particular, ion exchange treatment of tap water to produce water machining fluid at a SV far exceeding 20 $h^{-1}$ was not even considered. Accordingly, no substantial research in ion exchange treatment of tap water was undertaken.

However, the inventor has discovered the following previously unknown phenomena (A) through (C) by carrying out ion-exchange treatment at a space velocity that has not been employed in the conventional ion exchange treatment of tap water for producing an EDM fluid.

(A) When tap water having a usual concentration of chlorine ions is treated by ion exchange at a conspicuously large SV, for example, 345 $h^{-1}$, electrical conductivity of the treated water is greater than that of treated water obtained from conventional ion exchange treatment at a small SV. However, even with treatment at such a large SV, the overall electrical conductivity of treated water in the storage tank can be regulated to some range, realistically to about 10 µS/cm. Moreover, it has been found that if the overall electrical conductivity of the treated water is regulated to such a range, chlorine ions in the treated water are sufficiently removed and the electrical conductivity produced by such ions is harmless to electric discharge machining, as will be described below.

(B) When tap water is continuously treated by ion exchange at a large SV, for example 345 $h^{-1}$, while monitoring the electrical conductivity of the treated water on the outlet side of resin phase, the change of electrical conductivity with the passage of time has no discontinuity. In other words, when the resins reach their working capacity limit or channeling occurs, resulting in a leakage of ions, the conventionally treated water on the outlet of resin phase is degraded, increasing the electrical conductivity, but the change ratio is gentle according to the present invention.

(C) In the situation where chlorine ions are the main cause of electrical conductivity, when two samples of tap water, which are conspicuously different in electrical conductivity from each other, for example, in the order of some 10 times, are treated by passing each through a resin phase at a large SV, for example 65 $h^{-1}$, the electrical conductivity of each of the resultant treated water samples is almost identical to the other. Further, when they are similarly treated by passing through the resin phase at a larger SV, for example, 345 h$^{-1}$, the electrical conductivity of each of the treated water samples is not identical to the other; however, when these samples of treated water are then additionally circulated through a resin phase, the overall electrical conductivity of each sample in the storage tank become constant.

The above phenomena (A) through (C) is explained using the equation (1), presented below, which describes the ion exchange speed in fixed bed ion exchange.

In fixed bed ion exchange, raw water (tap water or water machining fluid) is continuously supplied to the resin phase from above and flows out through the resin phase. In such a case, at the start of passage of raw water, various ions dissolved in the raw water are first adsorbed to resins on the top layer of resin phase. After adsorption to resins on the top layer has progressed and the adsorption capacity of the top layer has been reached, ions in the raw water supplied thereafter are adsorbed to resins on the layer next to the top layer. In this way, that part of the resin phase in which the ion exchange reaction is actively occurring, i.e., the ion exchange band, moves downward as the treatment progresses, and finally ion exchange phase reaches its breakthrough point.

If the material balance of individual ions should be regarded as to the ion exchange band, the following equation is given with respect to individual ions.

$$-udc = Kfa(C-C_1)dz \qquad (1)$$

Here, u stands for the superficial linear velocity in a column (m$^3$/h·m$^2$), and dc stands for the concentration change of the ion in the raw water being exchanged. Therefore, udc represents the concentration change of the ion decreased by ion exchange within an ion exchange band having a required length dz, in other words, the ion exchange speed.

C stands for the concentration of ion in raw water within the ion exchange band of a required length dz, $C_1$ stands for the equilibrium concentration of the ion and dz stands for the required length of the ion exchange band.

The C is not a specific concentration, but an optional concentration at any time in the process where the concentration of the ion in raw water within the ion exchange band of a required length dz is decreased.

Kfa stands for the overall volumetric coefficient of mass transfer (1/h). The overall volumetric coefficient of mass transfer is a coefficient obtained by multiplying the overall coefficient of mass transfer (Kf) by the particle surface area (a) of the ion-exchange resins (including surface area inside holes formed in particle) within the ion exchange band of required length dz.

The overall volumetric coefficient of mass transfer is used, because the particle surface area of ion-exchange resins within the ion exchange band of a required length dz is unclear.

The overall coefficient of mass transfer (Kf) is a coefficient representative of the ease of ion transfer, in other words, it is representative of the ease of ion diffusion when ions, each having its own respective propulsive force, diffuse to the ion exchange resins from the raw water.

Additionally, the overall volumetric coefficient of mass transfer (Kfa) is assumed to depend greatly on the rate-determining step of ion transfer, i.e., on ion diffusion in a laminar film on the surface of the ion-exchange resin particles and the ion diffusion inside particles of the ion-exchange resins. However, with regard to the ion exchange treatment of tap water or, more particularly, that of used machining fluid, the coefficients of the ions are unknown, since many different kinds of ions are generated and exist in a mixed state.

Phenomenon (A), described above, can be explained based on Equation (1), as follows.

Even with a conspicuously large SV, for example 345 h$^{-1}$, chlorine ions in tap water are adsorbed to resins. Therefore, with respect to chlorine ions, if the superficial linear velocity in a column (u) is made conspicuously large, the ion exchange speed (udc) increases with the phenomenon (A).

As will be described below, when tap water is treated by ion exchange at a conspicuously large SV so that its electrical conductivity reaches about 10 μS/cm or less, the required length of ion exchange band is short due to great volume of treated water.

Therefore, with respect to chlorine ion, the overall volumetric coefficient of mass transfer (Kfa) is assumed to be extremely large.

In addition, when increasing the SV, the electrical conductivity of the treated water will increase. The ions which cause the increased electrical conductivity are assumed to have a small overall volumetric coefficient of mass transfer (Kfa).

In the present invention, ion exchange treatment at a conspicuously large SV has been proposed. It has been found that the overall volumetric coefficient of mass transfer (Kfa) of chlorine ion is extremely large and extremely different from that of other ions, when the ion exchange treatment is carried out at a conspicuously large SV by means of a fixed bed.

Phenomenon (B) can be thought, as follows, on the basis of Equation (1).

When tap water is treated by ion exchange at a large SV, chlorine ions are prevented from suddenly leaking out due to channeling. Therefore, even in the situation where channeling can occur, ion exchange speed (udc) is large since the Kfa of chlorine ion is large when tap water is treated by ion exchange at a large SV.

Additionally, it is assumed that because the change of electrical conductivity with the passage of time has no discontinuity, an ion exchange band having the length (dz) required for ion exchange of chlorine ions falls down while keeping a certain uniformity.

Further, phenomenon (C) can be thought, as follows, on the basis of the Equation (1).

The ion exchange speed of chlorine ion is conspicuously greater than that of weak electrolyte ions, such as ferric acid, silicic acid, carbonic acid, etc. Therefore, chlorine ions in raw water can be completely ion exchanged without regard for the magnitude of its concentration.

FIG. 1 illustrates the relationship between a volume of treated water having an electrical conductivity of about 10 μS/cm and the SV used when the treated water is obtained by circulating tap water through a resin column for ion exchange treatment.

In FIG. 1, the volume of treated water (on the abscissa) is plotted against the SV used (on the ordinate) and the treated water volume at 345 h$^{-1}$ proves to be greater by several times relative to that at a conventional SV. A SV of 20 h$^{-1}$ is the value that is thought to be the maximum value in the conventional ion exchange treatment of tap water for producing EDM fluid and of an aqueous EDM fluid.

It will be clearly understood from FIG. 1 that as the SV is increased, the volume of treated water is doubly increased, in other words, the useful life of the ion-exchange resins is doubly increased. Therefore, the work needed to replace the resins can be decreased and, accordingly, continuous operation over a long period of time in unmanned factory can be realized.

In the ion exchange treatment of tap water used to produce EDM fluid or aqueous EDM fluid according to the present invention, raw water is brought into contact with 2 liters of the resins while varying space velocity.

The upper limit of space velocity depends mainly on the physical strength of the resins or the mechanical strength of the column, for example, it can be set to 500 $h^{-1}$.

The value of the space velocity of the present invention is acceptable if it exceeds 20 $h^{-1}$, and it is preferred to choose a SV where the volume of the treated water sharply rises as shown in FIG. 1.

For example, a SV in a range of from 30 $h^{-1}$ to 350 $h^{-1}$ is preferably selected. More preferably, a SV in a range of from 75 $h^{-1}$ to 350 $h^{-1}$ is selected.

Next, with regard to a water machining fluid used in wire-cut EDM as a dielectric medium, a similar ion exchange treatment is experimentally carried out.

In wire-cut EDM, a brass, molybdenum or tungsten wire is used as a machining electrode, depending on the application, and a workpiece is machined by means of electric discharges through the water machining fluid with the electrical conductivity regulated to a range of from 50 to 10 µS/cm. As wire-cut EDM is characterized in that any conductive workpieces are machinable, there may be a large variety of workpiece materials and the workpiece may include many kinds of elements.

When electric discharge machining is performed in the presence of water as the machining fluid across the gap between the electrode and the workpiece, the temperature increases in the machining area and the elements, from which the materials of the electrode and the workpiece are composed, are dissolved in the water in their ionic states. With the increased amount of ionic substances dissolved in the water, the electrical conductivity of the water machining fluid gradually increases. For example, the following ions may be contained in the water after machining, though it depends on the materials of the electrode and the workpiece. First, there is a group of ions including metallic ions, such as iron ion, zinc ion and copper ion, silicic ion and carbonic acid ion, which is produced as a result of dissolution in the water machining fluid of carbonic acid gas from the atmosphere. This group of ions, which is harmless to electric discharge machining, is referred to as "harmless ions". Next, there is a group of ions which includes ions derived from metals such as molybdenum, chrome, tungsten, cobalt, etc., and the above-mentioned chlorine ion. This group of ions, which is harmful to electric discharge machining, is referred to as "harmful ions".

The ions harmful to electric discharge machining cause an increase in electrical conductivity, which results in electrolyte corrosion. Further, as a result, any metallic binder tends to dislodge when the workpiece is composed of a sintered alloy, and rust tends to form on steel workpieces. The "harmless ions", except for the carbonic acid ions, combine with carbonic acid ions and precipitate, having formed insoluble salts. Therefore, these "harmless ions" do not have a large influence on the electrical conductivity, even if they are present in the machining fluid. In contrast to this, the "harmful ions" produce inorganic acids (strong acids, such as molybdenum acid and chromium acid, etc.) and exert a considerable influence on the electrical conductivity.

With conventional ion exchange treatment at low space velocity, all kinds of ions are removed. If the "harmless ions" are positively removed in this way, the precipitated metals and salts in the saturated states will re-dissolve and ionize again. As a result, an unnecessary ion exchange is carried out again, shortening the useful life of resins. In addition, with a low space velocity, rust preventives added to prevent rust of a workpiece will be adsorbed by the resins, since they are polarized inside the molecule.

Therefore, the "harmful ions" can be selectively and preferentially removed from the water machining fluid containing various kinds of ions in a mixed state by circulating the used water machining fluid through a resin column at a conspicuously large space velocity according to the present invention.

It has been discovered that when the used water machining fluid is treated by ion exchange at a SV in excess of 20 $h^{-1}$ until the electrical conductivity of the treated water reaches 10 µS/cm, the electrical conductivity is derived from the "harmless ions" so that the useful life of resins will be extended. Further, even in the case of used water machining fluid, when the SV exceeds 20 $h^{-1}$, the volume of the treated water will be sharply increased, as shown in FIG. 1.

Additionally, since harmless and harmful ions are also contained in machining fluid which has been used in die-sinking EDM with increased electrical conductivity, the electrical conductivity must be reduced with the ion exchange treatment. Similarly, it has been discovered that when the raw water is circulated through an ion-exchange resin phase at a SV in excess of 20 $h^{-1}$ until electrical conductivity of the treated water reaches 10 µS/cm, the treated water can be regenerated for electric discharge machining. Like wire-cut EDM, when the SV is more than 20 $h^{-1}$, the volume of the treated water will sharply increase.

Though the upper limit of space velocity depends mainly on the physical strength of resins and the mechanical strength of the column, it is acceptable to adopt an SV such that the treated water, after passing through the resins, will have a value smaller than the desired electrical conductivity.

In the ion exchange treatment method of the present invention, raw water (either tap water or aqueous EDM fluid may be used) is typically passed from above through a fixed bed to bring it into contact with the ion-exchange resins, and then is removed from the fixed bed at its lower part. The other passing mode of raw water may be used. In general, the fixed bed of ion-exchange resins is formed by filling a vertically long column with ion-exchange resins. The ratio of the fixed bed height to diameter may be 1:1 and it is preferable to be in the range of from 2:1 to 4:1. It is difficult to pass the raw water through the resins at a space velocity in excess of 20 $h^{-1}$ by the conventional method, in which raw water collected in the upper portion of a resin phase formed in a column is allowed to flow down by the potential of gravity. Therefore, it is suitable to feed the raw water to the column under pressure by means of a pump. This is an unprecedented method in light of the conventional ion exchange treatment in electric discharge machining. In the conventional ion exchange treatment, it is thought in principle to pass a fluid through the fixed bed (ion-exchange resin phase) in almost a piston flow (plug flow) manner.

Thus, in the present invention, the ion exchange treatment method differs from the conventional method, in that the pressurized fluid is passed through a fixed bed (ion-exchange resin phase) at a high speed, namely at a high SV.

The tap water is treated by ion exchange according to the present invention until the electrical conductivity thereof is lowered to not more than 50 µS/cm because the treated water having an electrical conductivity of over 50 µS/cm may include chlorine ions.

The lower limit of electrical conductivity is chosen such that the treated water volume per unit volume of resins increases. In wire-cut EDM, when the workpiece is not submerged under the machining fluid and is machined only by flushing of the machining area, the water machining fluid is generated so that the electrical conductivity is regulated to a range of from 17 to 20 μS/cm to prevent the electrolytic corrosion of the workpiece. Further, when machining a workpiece submerged under the machining fluid, the water machining fluid is generated so that the electrical conductivity is regulated to a lower range of from 5 to 10 μS/cm to prevent the electrolytic corrosion of the workpiece. In die-sinking EDM, when the machining fluid, whose electrical conductivity is finally regulated to a range of from 1 to 10 μS/cm, is generated, an increase in the treated water volume and in a longer useful life of resins can be expected. If raw water is treated until the electrical conductivity is lowered to a value considerably smaller than 1 μS/cm, the treated water has a lower electrical conductivity than necessary to perform stable and efficient electric discharge machining. This excessive resistance of the machining fluid results in unnecessary consumption of ion-exchange resins. The longest life of resins can be expected when the electrical conductivity of the treated water is regulated to not more than about 50 μS/cm, though the required electrical conductivity depends on a variety of machining modes.

Machining fluid for the die-sinking EDM is produced such that the electrical conductivity is regulated to not more than 10 μS/cm. The machining fluid for wire-cut EDM is ion-exchanged water, while the machining fluid for die-sinking EDM is produced by mixing the ion-exchanged water with water-soluble high molecular compounds having an insulating property at the volume percentage of 50%–50%. Therefore, when mixing the ion-exchanged water having an electrical conductivity of about 50 μS/cm with the water-soluble high molecular compounds, a machining fluid having an electrical conductivity of 10 μS/cm is obtained. This is also applicable to the ion exchange treatment for regenerating the used machining fluid. When the used machining fluid is regenerated so that the electrical conductivity is regulated to not more than 10 μS/cm, with regard to water contained in the regenerated machining fluid, the electrical conductivity is regulated to 50 μS/cm. As described above, this level enables the longest useful life of resins without leakage of ions harmful to electric discharge machining.

As long as the lower limit of electrical conductivity is in a range where the treated water volume per unit volume of resins increases, the advantageous effects of the invention can be observed. More concretely, when the lower limit is not less than 0.2 μS/cm, the increase of treated water volume can be maintained.

The tap water described herein means water which is generally used, however, it is not limited to tap water. The volume of chlorine ions contained in tap water is usually in the range of from several ppm to several tens of ppm, though it depends on areas and countries, and such a range poses no problems to the method of the present invention.

The aqueous machining fluid for die-sinking EDM is a solution obtained by adding water-soluble high molecular compounds such as polyethylene glycol, etc. to ion-exchanged water or to tap water for improvement of machining performance.

Ion-exchange resins generally mean polymers of a three-dimensional network structure having an ion-exchange group, but the term "ion-exchange resin" additionally denotes a carrier (for example a spherical carrier) whose surface is covered by an ion-exchange membrane. The ion-exchange resins may consist of a single kind of resin or various kinds of resins.

In light of the function of the ion-exchange group, ion-exchange resins are largely classified into cation ion-exchange resins and anion ion-exchange resins. Further, the cation ion-exchange resins are divided into the strong acid and the weak acid, while the anion ion-exchange resins are divided into strong base and the weak base. The ion-exchange resins to be used in the present invention at least partially contain anion ion-exchange resins. In other words, the anion ion-exchange resins may be used alone or in combination with the cation ion-exchange resins. It is preferable to use the strong base anion ion-exchange resins in combination with the cation ion-exchange resins.

Additionally, it is preferable to use the strong base anion ion-exchange resins in combination with the strong acid cation ion-exchange resins when an aqueous solution, in which water-soluble high molecular compounds have been dissolved, is treated by ion exchange for producing a machining fluid for die-sinking EDM. Similarly, it is preferable to use strong base anion ion-exchange resins in combination with strong acid cation ion-exchange resins when the water machining fluid used in wire-cut EDM is treated by ion exchange. A quaternary ammonium group as the strong base anion ion-exchange resin, a sulfonic acid as the strong acid cation ion-exchange resin and a carbonic acid as the weak acid cation ion-exchange resin are typically used.

The resins may have any of the structures such as a gel, a porous structure, and a carrier holding type structures. A crackless type of the gel-like resins is suitable for the treatment of the aqueous machining fluid because of its large ion-exchanging capacity. The "harmful ions" can be preferentially captured in particular when strong base anion ion-exchange resins are used in the method of the present invention.

In producing aqueous machining fluid, the following examples of the ion exchange treatment method of the invention will now be described.

(a) The tap water is treated by ion exchange according to the invention so that the electrical conductivity is regulated to not more than 50 μS/cm, preferably to the range of from 10 to 50 μS/cm. Then, the ion-exchanged water is mixed with pure water to produce a water machining fluid, or it is mixed with water-soluble high molecular compounds to produce a machining fluid for die-sinking EDM.

(b) The tap water is mixed with pure water, and then the mixture is treated by ion exchange until the electrical conductivity is regulated to a desired value to produce a water machining fluid. Similarly, a mixture of tap water and water-soluble high molecular compounds is treated by ion exchange until the electrical conductivity is regulated to a desired value to produce machining fluid for die-sinking EDM.

In regenerating aqueous machining fluid used once in machining, the following examples of the ion exchange treatment method of the invention will now be described.

The machining fluid used in wire-cut EDM or die-sinking EDM, whose electrical conductivity is increased due to products produced during machining, is circulated through a resin column so that the electrical conductivity is regulated to not more than 50 μS/cm, preferably to the range of from 10 to 20 μS/cm More concretely, the used machining fluid is filtered to remove insoluble products (machined particles) and stored in a storage tank. The filtered fluid is passed through the ion-exchange resin phase at a space velocity such that a desired electrical conductivity is obtained according to the invention. The treated water is directly delivered to the machining area to serve as machining fluid. Alternatively, the used machining fluid is filtered and stored in a storage tank. Then, the filtered machining fluid in the storage tank is treated by ion exchange according to the present invention and the treated water is returned to the storage tank again. This circulation is carried out until the overall electrical conductivity of the fluid in the storage tank reaches a desired value. In this case, part of the machining fluid in the storage tank is circulated through the resin phase back to the tank, while detecting the overall electrical conductivity of the fluid in the storage tank. When the overall electrical conductivity is lowered to a required value, ion exchange treatment is stopped. Then, when the used machining fluid is later delivered from a work tank to the storage tank, and thereby the electrical conductivity is increased, the ion exchange treatment may start again in response to an output signal of a conductivity detector.

Figure 2:
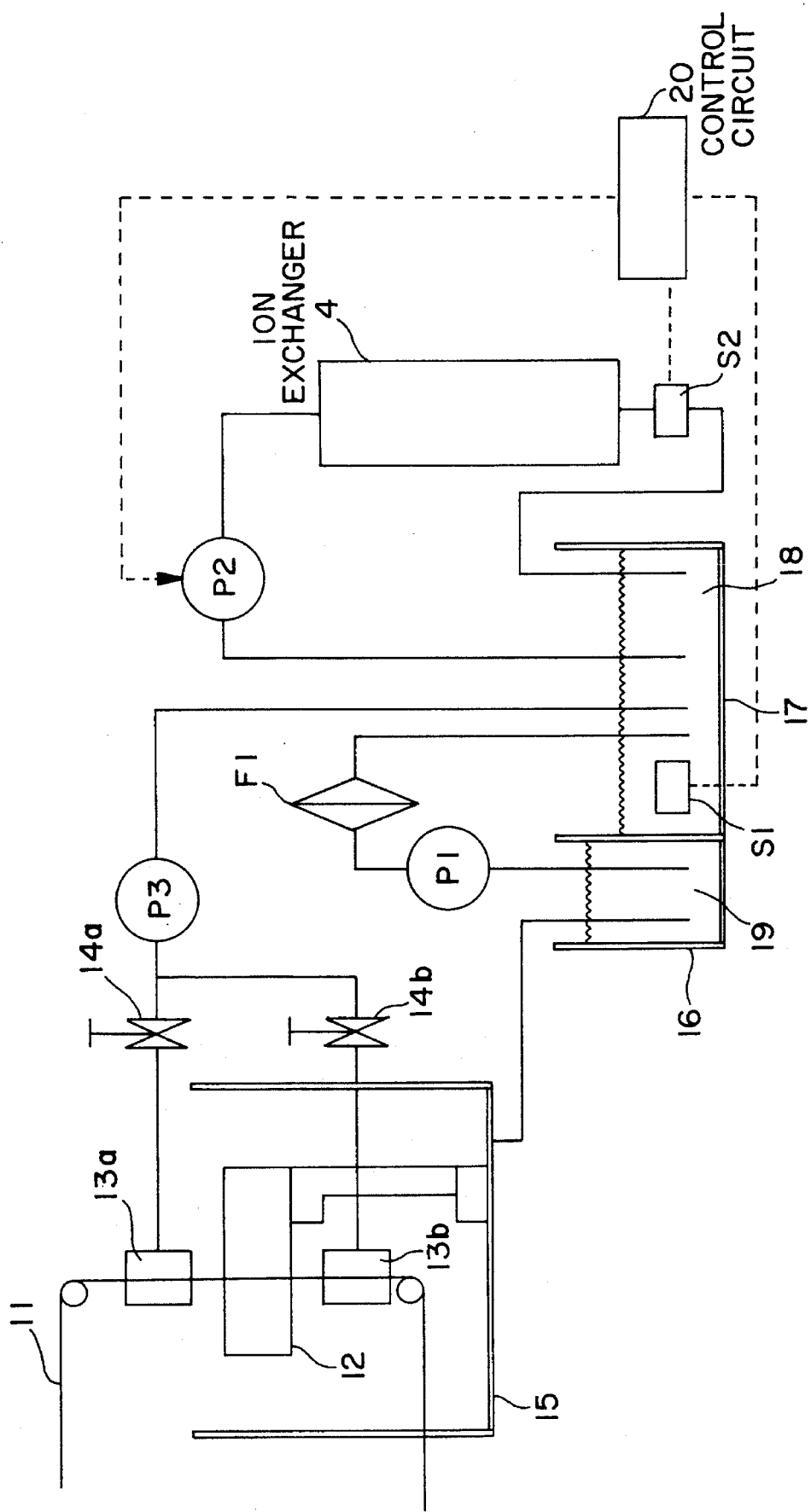
FIG. 2 is a schematic representation of a wire-cut EDM apparatus used for regenerating water machining fluid according to the present invention.

The regeneration of the used water machining fluid will now be described with reference to a wire-cut electroerosion apparatus as shown in FIG. 2. In FIG. 2, the wire-cut electroerosion apparatus is provided with nozzle parts 13a and 13b for supplying the water machining fluid to a machining gap formed between a wire electrode 11 and a workpiece 12, respectively. The water machining fluid in a storage tank 17 is delivered by means of a pump P3 to the nozzle parts 13a and 13b through flow regulating valves 14a and 14b, respectively. The used machining fluid 19 is collected in a work tank 15, and delivered to a waste water tank 16. The used fluid 19 in the waste water tank 16 is delivered through a filter F1 to the storage tank 17 by means of a pump P1. Sensors St and S2 are provided for detecting electrical conductivity and supplying an output signal representative of the detected value, respectively, to a control circuit 20 for driving a pump P2. A column 4 charged with ion-exchange resins is provided for treating raw water which is delivered by means of the pump P2.

Next, the treatment for regeneration will now be described. The filtered water machining fluid 18, stored in the storage tank 17 as described above, includes ions produced in the machining gap and ions which entered from the atmosphere during the pass of fluid. Accordingly, electrical conductivity of the fluid 18 has increased. A predetermined value of electrical conductivity is set by means of a setting device (not illustrated). The sensor S1 detects the electrical conductivity of the fluid 18 in the storage tank 17 and supplies an output signal representative of the detected value to the control circuit 20. When the detected value exceeds the set value, the control circuit 20 drives the pump P2 to deliver the fluid 18 to the column 4. The sensor S2 detects the electrical conductivity of the treated water at the outlet of the column 4 and supplies an output signal representative of the detected value to the control circuit 20. The control circuit 20 controls the power of the pump P2 so that the electrical conductivity of the treated water at the outlet of the column 4 is maintained at a value not more than the set value. The pump P2 may be controlled by an inverter. An operator may regulate the flow rate while watching a water resistivity meter. When the overall electrical conductivity in the storage tank 17 is lowered to the set value, the pump P2 is stopped. When the machining fluid is short due to evaporation thereof, tap water is replenished and the same treatment is executed.

Similarly, the machining fluid used in die-sinking EDM is treated by ion exchange such that the electrical conductivity is regulated to not more than 10 µS/cm, preferably to the range of from 10 µS/cm to 5 µS/cm.

The experimental examples will now be described to explain the invention in detail. The invention is not limited the following examples.

EXAMPLE 1

Figure 3:
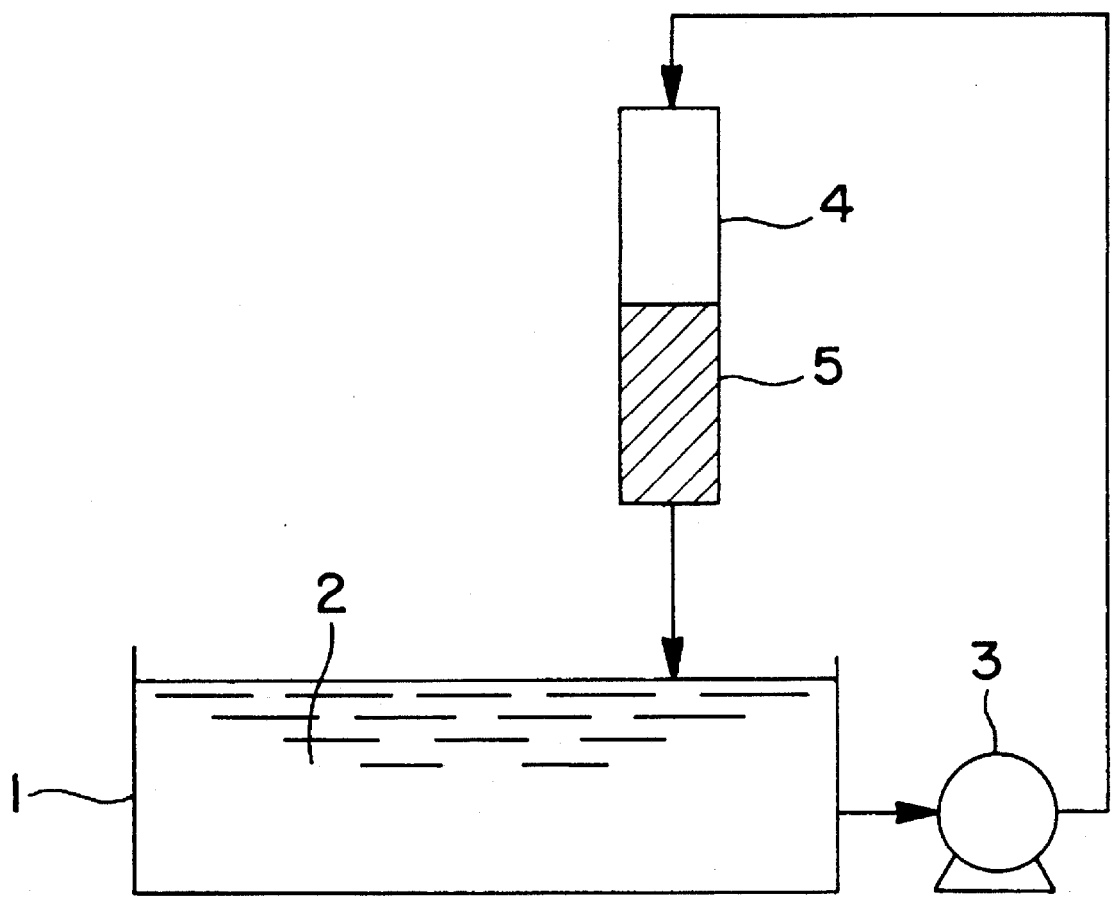
FIG. 3 is a schematic representation of an experimental apparatus for ion exchange treatment according to the present invention.

In these examples, an experimental device 1, as illustrated in FIG. 3, is used. In FIG. 3, tap water 2 as raw water is stored in a storage tank 1. The tap water 2 is supplied to the column 4 from above by means of a pump 3, passed through ion-exchange resins 5 charged in the column 4, and returned to the storage tank 1.

The experimental conditions are as follows.

Volume of tap water 2 in storage tank 1 . . . 270 liters

Capacity of column 4 . . . 10 liters

Volume of resins charged in column 4 . . . 2 liters

Flow rate of tap water 2 to column 4 . . . 2.5 liters/min. (This flow rate corresponds to a SV of 75 $h^{-1}$)

Electrical conductivity of tap water 2 . . . 100 µS/CM

Target electrical conductivity . . . 10 µS/cm

The experiment is carried out according to the following method.

First, 270 liters of tap water 2 having an electrical conductivity of 100 µS/cm is supplied to the storage tank 1. Then, tap water 2 is delivered to the column 4 for ion exchange, and returned to the storage tank 1. The tap water 2 is circulated in this way until the overall electrical conductivity of water 2 in the storage tank 1 is reduced to 10 µS/cm, and this circulation process is defined as a cycle.

When the overall electrical conductivity of water 2 in the storage tank 1 reaches 10 µS/cm, all the tap water 2 is replaced with 270 liters of new tap water to execute the same process. During the experiment, electrical conductivities of treated water at the outlet of the column 4, as well as the time of a cycle, are measured at the beginning and the end of a cycle. This experiment is stopped when the time of a cycle is 1.5 times longer than that of a preceding cycle. The volume of treated water is calculated based on the measured time of a cycle, the number of cycles and the flow rate of tap water. Further, the volume of treated water per 1 liter of resins is calculated.

In Examples 2 and 3, which will be described below, the volume of treated water per 1 liter of resins is similarly calculated. FIG. 1 is a graph which represents the relationship between the volume of treated water per 1 liter of resins and the SV used.

EXAMPLE 2

The experimental procedure is the same as in Example 1, except that the flow rate of tap water 2 supplied to the column 4 is 11.5 liters/min, which corresponds to a SV of 345 $h^{-1}$.

EXAMPLE 3

The experimental procedure is the same as in Example 1, except that the volume of resins 5 charged in the column 4 is 10 liters and the flow rate of tap water 2 supplied to the column 4 is 10.5 liters/min, which corresponds to a SV of 63 $h^{-1}$.

In Example 3, at the beginning of first cycle, the electrical conductivity of the treated water at the outlet of the column 4 measured 0.2 µS/cm, while at the beginning of 15th cycle, that value measured 5.5 µS/cm. However, in both cycles, the volumes of treated water were almost identical, i.e., 630 liters.

Thus, in early cycles (for example, in the first cycle), the electrical conductivity of the treated water at the outlet of the column is reduced to a conspicuously lower value, for example 0.2 μS/cm, than a desired value, i.e., 10 μS/cm. This excessive ion exchange treatment in early cycles results in wasteful consumption of resins.

Therefore, it is desirable that in early cycles, tap water is passed through ion-exchange resins at a larger SV so that the electrical conductivity of the treated water is reduced to not more than 10 μS/cm. This will result in an increase of treated water with a longer useful life of resins.

The ion exchange treatment of the present invention for producing the machining fluid for electric discharge machining, enables the useful life of resins to be increased, resulting in lower costs. Further, continuous operation over a long period of time is achieved with high machining efficiency. Additionally, in regenerating the machining fluid used in electric discharge machining with ion exchange treatment, the useful life of resins are similarly increased.

I claim:

1. An aqueous electric discharge machine fluid producing method for producing an aqueous electric discharge machine fluid which is used for electric discharge machining in which a workpiece is machined by inducing electric discharges in a machining gap formed between an electrode and a workpiece while disposing the aqueous EDM fluid in the machining gap, comprises:
   (a) a process of supplying raw water under pressure into a container charged with ion-exchange resins;
   (b) a process of detecting electric conductivity of treated water being obtained from the container charged with the ion-exchange resins; and
   (c) a process of adjusting the supply flow rate of raw water at the space velocity at least higher than 20 $h^{-1}$ whereby the detected electric conductivity of said treated water may become lower than 50 μS/cm.

2. An aqueous electric discharge machine fluid regenerating method for regenerating an aqueous electric discharge machine fluid which was used in electric discharge machining in which a workpiece is machined by inducing electric discharges in a machining gap formed between an electrode and a workpiece while disposing the aqueous EDM fluid in the machining gap, comprises:
   (a) a process of collecting used machining fluid that has been supplied to the machining gap for its use in the electric discharge machining;
   (b) a process of filtering the collected machining fluid and storing it into a storage tank;
   (c) a process of supplying the stored machining fluid under pressure into a container charged with ion-exchange resins for the enforcement of ion exchange treatment inside the said container;
   (d) a process of detecting electric conductivity of treated water being obtained from the container;
   (e) a process adjusting the supply flow rate of the stored machining fluid at the space velocity of at least higher than 20 $h^{-1}$, whereby the detected electric conductivity of said treated water may become lower than a desire value; and
   (f) a process of returning to the storage tank the treated water obtained after the adjustment of supply flow rate and circulating the treated water through the container until the overall electric conductivity of machining fluid in the storage tank may become a desired value.

3. An aqueous electric discharge machine fluid producing or regenerating method of the claim 1 or 2, wherein said container has a proportion of length to (a cross sectional area)$^{1/2}$ is in the range of from 1:1 to 4:1.

4. An aqueous electric discharge machine fluid producing or regenerating method of the claim 1 or 2, wherein ion-exchange resins to be used with ion exchange include at least strong base anion ion-exchange resins.

* * * * *